Patented Nov. 24, 1936

2,061,934

UNITED STATES PATENT OFFICE 2,061,934

RUBBER-LIKE SYNTHETIC HIGH-MOLECULAR MASSES

Martin Mueller-Cunradi and Kurt Pieroh, Ludwigshafen-on-the-Rhine, Germany, assignors to I. G. Farbenindustrie Aktiengesellschaft, Frankfort-on-the-Main, Germany No Drawing. Application April 12, 1935, Serial No. 16,014. In Germany April 18, 1934

9 Claims. (Cl. 260—2)

This invention relates to improved, rubber-like, synthetic, high molecular masses.

It is already known that by the polymerization of vinyl ethers, substances of high molecular weight are obtained which are balsam-like viscous and sticky or wax-like depending on the nature of the vinyl ether employed.

We have now found that polymerization products having a great external similarity to rubber are obtained by polymerizing vinyl isobutyl ether of a very high degree of purity at temperatures below about 10° C. by means of boron fluoride which may be employed as such or in the form of its addition products with organic oxygen bearing compounds.

Vinyl isobutyl ether of the necessary degree of purity is obtained, for example, by treating the ether which has been previously purified by distillation with metallic sodium. Even a trace of boron fluoride or its addition products with organic oxygen bearing compounds is sufficient to effect the polymerization. As suitable addition products (see Gmelin's "Handbuch der anorganischen Chemie", 8th edition, volume Boron, page 114 et seq.) may be mentioned those with, for example, ethers, such as diethyl or dibutyl ethers, ketones or alcohols.

Very good products are obtained, for example, by working at temperatures of 40° below zero C., but temperatures of 80° below zero C. or about zero may also be employed. It is preferable to cool during the polymerization, for example, by carrying out the polymerization in liquid ethane or propane or organic solvents to which solid carbon dioxide has been added or by adding solid carbon dioxide alone. When working at temperatures above 10° C., sticky products are usually obtained, and insufficiently purified vinyl isobutyl ether also usually yields more sticky and soft products than highly purified vinyl isobutyl ether.

The polymerization usually takes place immediately and the yield is usually practically quantitative. The polymerization products are preferably freed from the volatile halides employed during the further working up, for example, by washing with water, if desired after previously dissolving the polymerization products in an organic solvent which is not miscible with water.

By adding to the vinyl isobutyl ether, before the polymerization, substances which are polymerized under the same conditions, the properties of the polymerization products may be varied. For example, the addition of other vinyl ethers or of isobutylene generally leads to soft products.

The polymerization products obtained are solid, elastic, rubber-like masses which can be extended to a considerable extent, but which offer a greater resistance to extension than rubber. They may be softened, for example by immersion in boiling water, and—like gutta-percha—assume their original consistency again after cooling. They are soluble in a large number of organic solvents, such as ethers, ketones, esters, chlorinated hydrocarbons, benzene, benzine, paraffin oils and lubricating oils.

By reason of their elasticity, the polymerization products are quite unbreakable and therefore suitable for the most various purposes; they may be employed, for example, as insulating material for electrical purposes, as coating agents, caulking compositions, adhesives and for the manufacture of shaped articles. With the aid of solutions of the products it is possible to provide metals, wood, textiles, paper, films or articles of nitrocellulose or acetyl cellulose or other solid substances with coatings or impregnations which are distinguished, inter alia, by the fact that they are chemically inert and entirely insensitive to attack by weathering and to acid vapors and caustic alkalies. The polymerization products may also be employed in the form of films, for example in the preparation of waterproof and unbreakable fabrics, by introducing films of the polymerization products between strips of fabric and pressing the whole while heating.

If necessary there may be added to the polymerization products further substances, such as rubber, resins (which generally speaking effect a solidification), synthetic polymerization products of various kinds, for example, those of butadiene and other diolefines, chlorodiolefines, acrylic acid compounds, organic and inorganic vinyl esters, vinyl ketones and styrene, furthermore softening agents, such as stearic acid, fillers, such as carbon black, kaolin or cork meal, or dyestuffs. When the added substances are capable of vulcanization, the resulting coatings or impregnations may be vulcanized.

The polymerization products are also suitable as a combining layer in the production of non-splintering glass having excellent properties, especially as regards stability to cold.

For this purpose, for example, a film of polymerized isobutyl vinyl ether, if desired swollen with solvents, may be laid between two glass sheets, the whole then being carefully pressed together, if desired while heating. When the polymerization products are still sticky, they may be uniformly distributed on a sheet of glass, for example by heating, and a second sheet of glass pressed on. Furthermore, clear films of nitrocellulose or acetylcellulose may be employed which have been provided on both sides with coatings of polymerized isobutyl vinyl ether, which are still sticky. If a film of liquid monomeric isobutyl vinyl ether or of a liquid polymerized isobutyl vinyl ether of a low degree of polymerization be produced on a sheet of glass and a second sheet of glass which has been exposed for a short time to the action of gaseous boron fluoride be pressed thereon, the polymerization of the film of liquid between the two sheets of glass takes place in a very short time with the combination of the two layers.

If desired, additional substances usually employed in the preparation of non-splintering glass, such as softening agents or dyestuffs, may be added to the polymerized or monomeric isobutyl vinyl ether.

The following examples will further illustrate how our invention may be carried out in practice, but the invention is not restricted to these examples. The parts are by weight.

Example 1

By fractional distillation over powdered potassium hydroxide, repeated three times, vinyl isobutyl ether is freed to a very great extent from the unconverted isobutyl alcohol arising from its preparation from acetylene and isobutyl alcohol. The main fraction, boiling within a range of 0.6° C. is subjected twice to refining by fractional distillation, the distillate after each distillation being allowed to stand for 24 hours over sodium wire. A final distillation yields a highest-boiling main fraction having a boiling point of 82.4° C. at 747 millimeters (mercury gauge). The degree of purity of the vinyl isobutyl ether may be tested by means of a piece of clean sodium which should undergo no change after lying for 12 hours in the ether.

25 parts of the vinyl isobutyl ether thus purified are mixed with 100 parts of liquid propane. Gaseous boron fluoride is led into the mixture for a few seconds while stirring. The polymerization commences immediately and turbulently and is practically complete after a few seconds. The heat of polymerization is withdrawn by the vaporizing propane so that the temperature does not exceed 40° below zero C. After allowing it to stand for some hours, the polymerization product is working up by boiling with water while kneading vigorously or by washing with hot water on rollers, if desired while adding a little ammonia, until all volatile or water-soluble constituents have been removed. After drying a practically quantitative yield of an entirely colorless product of great strength and elasticity is obtained, which is extremely similar to crepe rubber in its external properties. It may be rolled into foils, pressed into plates and combines the thermoplastic properties of gutta-percha with the elastic properties of rubber. A comparative test at room temperature and at about the same extension, gave a strength of the polymerization product of five times, in part even more than five times, the strength of crepe rubber. The polymerization product is soluble in the usual organic solvents and especially well in ether and hydrocarbons. The solutions have high viscosities.

The reaction mass may also be worked up by first removing the propane and part of the boron fluoride by applying a vacuum. A sponge-like product then remains which is freed from soluble constituents by washing while rolling or kneading.

Example 2

Vinyl isobutyl ether purified as described in Example 1 is stirred into a paste with solid carbon dioxide, a small amount of boron fluoride being led in at 80° below zero C. while stirring. The paste immediately solidifies to a crumbly mass which is left for some time at the said temperature. The product is worked up in the manner described in Example 1. It has properties similar to those of the product obtainable according to Example 1.

Example 3

500 parts of vinyl isobutyl ether are mixed with twice their amount of liquid propane. This mixture is continuously supplied to a mixer, together with 700 parts of liquid propane which at its boiling point has been saturated with boron fluoride. Polymerization begins immediately after mixing and is completed in a vessel which is connected with the mixer and like the mixer itself stands under atmospheric pressure. From this vessel, the highly-viscous solution obtained is led to a washing apparatus by means of a pressure pump. It is washed therein, preferably after adding a further amount of liquid propane, with water to which a slight amount of ammonia or alkali may be added, at elevated pressure and at ordinary or slightly elevated temperature.

The solution of poly vinyl isobutyl ether in propane is separated off from water, whereupon the propane is removed by evaporation under elevated or atmospheric pressure. The polymerization product remaining behind, for removing any traces of propane or moisture, may be subjected to a subsequent drying, preferably at a slightly elevated temperature and at reduced pressure.

The product has similar properties as that obtained according to Examples 1 and 2.

Example 4

Clean sheet aluminium is immersed in a 10 per cent solution of a polymerized isobutyl vinyl ether obtained according to Example 1 in benzene. The adherent, non-sticky film remaining on the metal surface after drying renders the metal substantially stable to weather influences, acid vapors or caustic alkalies.

Example 5

A film of polymerized isobutyl vinyl ether obtained according to Example 2 is laid between two sheets of fabric, such as, for example, of cotton, wool, linen, silk or artificial silk. The three layers are united by pressing while heating. Fabrics impregnated in this manner do not break and are impermeable to water. If it is desired to coat a sheet of fabric on only one side, a film of polymerized isobutyl vinyl ether is applied to one side of the fabric and during the hot pressing the said film is covered with a film of cellulose such as is obtainable under the trade name "Cellophane" in order to prevent the film of polymerized isobutyl vinyl ether from sticking to the calender rollers. When the sheet of fabric and the film of polymerization product have been united, the film of "Cellophane" may be readily removed again.

The impregnation of fabrics (and also of paper and leather) may also be carried out by drawing the substance concerned through an about 10 per cent solution of the polymerized isobutyl vinyl ether in benzine and then drying.

*Example 6*

Stuffing for cushions and the like, such as horsehair, kapok or seaweed, is sprayed with a 10 per cent solution of a polymerized isobutyl vinyl ether obtained according to Example 1 in ethyl ether after having been packed together. After evaporation of the ethyl ether, the fibers are stuck together. Stuffings of this kind are very stable to compression by being sat upon in use. Pressed materials of all kinds and leather fibers may also be stuck together by means of the said solution, the resulting materials being firm and flexible.

*Example 7*

A clear film of acetyl cellulose, nitrocellulose or the cellulosic film known by the trade name "Cellophane" is provided on both sides with a film of polymerized isobutyl vinyl ether obtained according to Example 1, a layer of fabric then being applied on both sides. The five layers are united by pressing while heating and a material is obtained which is insensitive to moisture and of high resistance to tearing. It may be employed for a great variety of purposes.

*Example 8*

A film of polymerized isobutyl vinyl ether obtained according to Example 1 is laid between two carefully cleaned sheets of glass and the whole carefully pressed while heating. The sheets of glass and/or the film may be previously coated with softeners, such as organic solvents, or substances which increase the adherence of the film, such as polymerization products of isobutylene. A safety glass having excellent properties is obtained, which is entirely free from bubbles, colorless and fast to light. Even after long periods of time there is no formation of cracks or bubbles, because the combining layer does not become brittle in course of time but retains its high elasticity.

*Example 9*

Two well-cleaned sheets of crystal glass of about 5 millimeters in thickness are prepared. Pure monomeric isobutyl vinyl ether obtained according to Example 1 is poured over one of the sheets so that after the excess of liquid has flowed off there remains a thin film of liquid. The other sheet of glass is then exposed for a few seconds to gaseous boron fluoride and then firmly pressed onto the first sheet. In a very short time the polymerization of the film of liquid between the sheets of glass takes place. Addition compounds of boron fluoride, such as boron fluoride-ethyl ether, may be employed instead of boron fluorid.

When necessary, there may be added to the monomeric isobutyl vinyl ether substances which increase the viscosity, for example, polymerization products of other vinyl ethers or highly polymerized isobutylene.

What we claim is:

1. The process for the production of solid, elastic, rubber-like, synthetic, high molecular masses which comprises polymerizing vinyl isobutyl ether of a high degree of purity at temperatures below 10° C. by means of boron fluoride.

2. The process for the production of solid, elastic, rubber-like, synthetic, high molecular masses which comprises polymerizing vinyl isobutyl ether of a high degree of purity at temperatures below 10° C. by means of boron fluoride in the form of its addition product with an organic oxygen-bearing compound.

3. The process for the production of solid, elastic, rubber-like, synthetic, high molecular masses which comprises polymerizing vinyl isobutyl ether of a high degree of purity at temperatures of between 10° C. and 80° below zero C. by means of boron fluoride.

4. The process for the production of solid, elastic, rubber-like, synthetic, high molecular masses which comprises polymerizing vinyl isobutyl ether of a high degree of purity at temperatures of between 40° and 80° below zero C. by means of boron fluoride.

5. The process for the production of solid, elastic, rubber-like, synthetic, high molecular masses which comprises polymerizing vinyl isobutyl ether of a high degree of purity at temperatures below 10° C. by means of boron fluoride in the presence of an organic solvent cooled down to the temperature employed.

6. The process for the production of solid, elastic, rubber-like, synthetic, high molecular masses which comprises polymerizing vinyl isobutyl ether of a high degree of purity at temperatures below 10° C. by means of boron fluoride in the presence of an organic solvent cooled down and kept at the temperature desired by addition of solid carbon dioxide.

7. The process for the production of solid, elastic, rubber-like synthetic, high molecular masses which comprises polymerizing vinyl isobutyl ether of a high degree of purity by means of boron fluoride in the presence of liquefied propane at normal pressure.

8. The process for the production of solid, elastic, rubber-like, synthetic, high molecular masses which comprises polymerizing vinyl isobutyl ether of a high degree of purity in mixture with other polymerizable substances at temperatures below 10° C. by means of boron fluoride.

9. Polymeric vinyl ether of isobutyl alcohol which is solid, elastic and of rubber-like character.

MARTIN MUELLER-CUNRADI.
KURT PIEROH.